United States Patent [19]

Dietrich et al.

[11] Patent Number: 5,773,044

[45] Date of Patent: *Jun. 30, 1998

[54] APPARATUS FOR THE MANUFACTURE OF CORRUGATED TUBING FROM THERMOPLASTIC SYNTHETIC RESIN

[75] Inventors: Karl Dietrich, Rain am Lech; Michael Hurler, Rögling; Hubert M. Drossbach, deceased, late of Oberhausen-Sinning, all of Germany, by Monica Drossbach-Ebell, Nicolaus Drossbach heirs

[73] Assignee: Drossbach GmbH & Co. KG, Rain am Lech, Germany

[*] Notice: The term of this patent shall not extend beyond the expiration date of Pat. No. 5,522,718.

[21] Appl. No.: 279,847

[22] Filed: Jul. 26, 1994

[30] Foreign Application Priority Data

Jul. 26, 1993 [DE] Germany ............................. 9311140 U

[51] Int. Cl.$^6$ .............................. B29C 53/20; A01J 21/00
[52] U.S. Cl. ......................... 425/370; 425/113; 425/116; 425/233; 425/326.1; 425/336; 425/337; 425/395
[58] Field of Search .................................... 425/370, 113, 425/116, 115, 233, 326.1, 336, 337, 395

[56] References Cited

U.S. PATENT DOCUMENTS

| | | | |
|---|---|---|---|
| 3,640,312 | 2/1972 | Bauman et al. | 138/121 |
| 3,994,644 | 11/1976 | Hegler et al. | 425/112 |
| 4,072,453 | 2/1978 | Oltmanns et al. | 425/62 |
| 4,212,618 | 7/1980 | Hegler et al. | 425/326.1 |
| 4,226,580 | 10/1980 | Lupke et al. | 425/504 |
| 4,365,948 | 12/1982 | Chaplain | 425/417 |
| 4,449,910 | 5/1984 | Leloux | 425/325 |
| 4,787,598 | 11/1988 | Rahn et al. | 249/162 |
| 4,846,660 | 7/1989 | Drossbach | 425/503 |
| 5,372,774 | 12/1994 | Lupke | 425/326.1 |
| 5,383,998 | 1/1995 | Lupke | 156/242 |

FOREIGN PATENT DOCUMENTS

| | | |
|---|---|---|
| 0 007 556 | 2/1980 | European Pat. Off. . |
| 0270694 | 6/1988 | European Pat. Off. . |
| 1918336 | 11/1969 | Germany . |
| 1231682 | 5/1971 | United Kingdom . |

OTHER PUBLICATIONS

Brochure of Deutsch Star GmbH "Das Linear-Programm"—Jun., 1989.

*Primary Examiner*—Nina Bhat
*Attorney, Agent, or Firm*—Jacobson, Price, Holman & Stern, PLLC

[57] ABSTRACT

An apparatus for the manufacture of corrugated tubing of thermoplastic including a shaping path adjoining the head of an extruder, composed of a guide arranged in a frame structure, along which guide mold halves closed together in pairs as annular molds are advanced in close succession, said mold halves being provided on a lower side thereof with racks, at least one drive pinion arranged in the initial part of the shaping path for meshing with the racks of the mold halves as the same are pushed along the path, and an outlet, following the shaping path, in which the mold halves are separated from one another and are transferred to mutually separate return paths, on which they are shunted back by a conveyor to the inlet. In order to ensure introduction of the mold halves free of bumping at the inlet and a corresponding impact-free withdrawal of the mold halves at the outlet of the shaping path, the conveyor includes sequentially arranged, driven pinions adapted to come into mesh with the racks on the mold halves. The transverse conveying of the mold halves between the outlet and the inlet is performed by a pinion driven in a transversely movable manner.

17 Claims, 14 Drawing Sheets

APPARATUS FOR THE MANUFACTURE OF CORRUGATED TUBING FROM THERMOPLASTIC SYNTHETIC RESIN

FIELD OF THE INVENTION

The invention relates to an apparatus for the manufacture of corrugated tubing of more particularly thermoplastic synthetic resin, comprising means defining a shaping path adjoining the head of an extruder, composed of a guide arranged in a frame structure, along which guide mold halves closed together in pairs as annular molds are advanced in close succession, said mold halves being provided on a lower side thereof with racks, at least one drive pinion arranged in the initial part of the shaping path for meshing with the racks of the mold halves as the same are pushed together, and an outlet, following the shaping path, at which the mold halves are separated from one another and are transferred to mutually separate return paths, on which they are shunted back by conveying means to the inlet.

BACKGROUND OF THE INVENTION

For the production of corrugated tubing, which is mostly plastic tubing provided with transverse corrugations and more particularly annular or helical corrugations, it is a known practice to mount mold halves on two endless, circulating chains so that following the head of an extruder they are thrust together at the shaping path to give two mutually parallel rows in each of which the mold halves of the respective row constitute hollow molds. These known devices are suitable for the production of small diameters of corrugated tubing, since it is possible to tolerate the disadvantage that the mold halves have to be moved close together along the return paths as well.

If however corrugated tubing with a larger diameter is to be produced, it is necessary to utilize mold halves of suitably large dimensions, whose manufacture is an intricate process and which involve substantial capital expenditure. In order to make do with the minimum number of mold halves, apparatus has consequently been proposed, in which the mold halves are solely moved together in the shaping path as trains in close succession, whereas they are shunted back separately at a high speed along the return paths so that it is basically only necessary to have one mold half in each return path at a time and accordingly the number of mold halves required for the production of corrugated tubes is reduced to a minimum.

In a device disclosed in the patent publication EP 0 270 694 B for the production of corrugated tubing the conveying device for shunting the mold halves back along the return paths consists of two return conveyors, extending along the shaping or working path at a distance from it and of four transverse conveyors which shift the mold halves between the inlet and outlet on the one hand and the return paths in the transverse direction on the other hand. Underneath the mold half path each of the return conveyors possesses an endless traction member comprising a run circulating in the direction of conveying of the respective conveyor. In this respect the traction members bear entrainment means, which at the start of the conveying path come into engagement with the mold halves, entrain the same and at the end of the return path come out of engagement with the mold halves. While this known apparatus ensures a completely satisfactory return movement of the mold halves along the return path, there are however certain difficulties in connection with the transverse shifting of the mold halves by means of transverse conveyors, since such conveyors must ensure a fitting together of the mold halves without any jamming and skew running in the inlet and a correspondingly free drawing apart of the mold halves at the outlet.

In an apparatus disclosed in the patent publication EP 0 007 556 B of the type initially mentioned the problem in connection with the fitting together of the mold halves without skew running and jamming together thereof at the inlet of the shaping path and the smooth drawing apart of the mold halves at the outlet of the working path is solved by designing the return means for the mold halves in the form of a carriage with a pivot arm which at its free end possesses a coupling member for disengeably coupling to one mold half. By suitable control of the pivotal motion of the pivot arms the translatory carriage motion may be combined with a pivotal movement in such a manner that on running into the inlet of the shaping path and when being removed therefrom at the outlet of the shaping path the mold halves may be guided together and caused to move along the desired oblique tracks. This known device does however suffer from the disadvantage of requiring elaborate and intricate design of the carriage and pivot arm structure owing to the required strength and the disadvantage that the return shunt along the return path is only possible using a carriage, which after each conveying action has to be shunted back again so that the speed of return shunt is limited and at any given time only one mold jaw half may be located in the return path.

SUMMARY OF THE INVENTION

One object of the invention is accordingly to provide an apparatus of the type initially mentioned, whose return paths are provided with continuously acting conveying means, in the case of which between the conveying path and the return paths transversely acting conveying means are provided, which ensure a bump-free introduction of the mold halves into the inlet and a corresponding withdrawal of the mold halves at the outlet of the shaping path.

In accordance with the invention this object is to be achieved in the context of an apparatus of the type initially mentioned since the conveying means comprise driven pinions adapted to come into engagement in sequence with the racks of the mold halves and since the transverse conveyance of the mold halves between the inlet and outlet is caused by transversely driven pinions. In the case of apparatus in accordance with the invention there is a uniform conveyance and movement of the mold jaw halves only by pinions so that pinion driving action is not limited to the feed of the mold jaw on the shaping path, and in fact is employed for the return shunting of the mold jaw halves along the return paths. In the apparatus in accordance with the invention there is a conveyance by pinions of the mold jaw halves between the outlet and the pinion drive at the inlet of the shaping path so that only uniform conveying means comes to be employed which renders possible conveying in a perfectly precise and regular fashion.

At the outlet part of the conveying path the racks of the mold halves respectively come into perfectly regular toothed engagement with the transverse conveying pinions, which on the one hand convey the mold jaw halves at the synchronous speed of the shaping path and afterwards or simultaneously transversely move the mold halves for lifting them out of the shaping path. In this respect the transverse conveying means may cause the mold jaw halves, which are to be removed, to move at a speed above the synchronous speed for a short time in order to facilitate transverse conveying by having a small gap between them and the following mold halves, something which reliably ensures removal thereof without bumping.

The introduction of the mold jaw halves in the inlet part of the shaping path is then performed in a corresponding manner.

Thus after the transverse conveying pinion have firstly moved the mold halves at the synchronous speed i. e. in synchronism with the shaping path, and preferably temporarily at a higher speed, the conveying movement in the working direction is modified to have a transverse conveying component. After this the pinion drive is reversed so that the respective mold half is transferred in the return path in synchro-mesh with the pinions of the return path. The pinions of the return path then accelerate the mold halves initially to the maximum conveying speed before the same further retard the mold halves for transfer to the transverse conveying pinions.

In accordance with a further advantageous development of the invention the driven pinions engaging the respective teeth of the racks on the mold halves in the inlet and outlet parts of the shaping path, have their end surfaces, or edge disks connected with them, in interlocking engagement with flanks which encircle the racks and the pinions are provided with drives transversely conveying the same. The pinion able to be driven both in rotation and also in the axial direction are able to cause the mold jaw halves to move both in the direction of the shaping path and also transversely in relation to it so that they can move the mold jaw halves on the desired paths of motion both out of the shaping path and also into the latter.

If the end surfaces of the pinions are provided with edge disks, the same will provide the necessary transmission of force for transversely conveying the mold halves.

It is convenient furthermore if the edge disks have a larger diameter than the pinions so that during transverse conveying the latter come into engagement over a larger area on the flanks encircling the racks in the desired fashion.

It is convenient if for each train of mold halves in the shaping path one respective drive pinion is provided. These synchronously driven drive pinions are then so adapted in a functional manner to the transverse conveying pinions that during the transfer of the mold halves to the same by the transverse conveying pinions they are in alignment with the latter.

As a basic feature of the invention the transversely conveying pinions may be caused to have a transverse component of the conveying movement by suitably shifting the pinion shafts in the axial direction. However, it is more advantageous to rotatably mount bearing each of the transversely conveying pinions in a carriage running in guides and provided with a drive for moving the carriage. In this respect each pinion bearinged in the carriage may be shiftingly mounted on a splined shaft, which is bearinged in fixed relationship to the frame structure and is provided with a drive, this being a simple way of providing the pinion with a rotary drive. The carriage itself can be provided in any desired fashion with a drive for moving it transversely. It is convenient if each carriage is able to be moved by a lead screw, which is bearinged in manner fixed in relation to the frame structure and is provided with a drive.

It is convenient if the mold halves are provided with racks on their top and lower sides, drives meshing with the upper racks also being provided in the initial part of the shaping path. This type of drive offers a highquality, even and non-skew conveying action for the mold jaw halves along the shaping path.

Furthermore it is convenient for the mold halves to be provided with oblique guide surfaces, which in the exit part of the shaping path cooperate with correspondingly oblique guide surfaces on the frame structure. These oblique guide surfaces ensure a satisfactory removal of the mold ribs of the mold halves from the valleys between the grooves of the corrugations.

It is convenient, moreover, if the mold halves are supported on rollers running on lateral guide sections along the shaping path. While the mold halves on the shaping path are exactly mutually aligned by the drive pinions in the axial direction thereof, the lateral guide or support sections provide a satisfactory connection between the mold halves, moving along the shaping path in pairs, to give an annular structure of the moving mold.

It is convenient as well if the mold halves are provided on the top side thereof with rollers or balls, freely supported for rotation, which may cooperate with upper guides or guide surfaces on the frame. Accordingly the mold halves may be supported by means of the rollers or balls on the guide surfaces so that undesired dislodgment of the mold halves is out of the question.

It is convenient furthermore if the pinions of each of the two return paths are drivingly connected together and are driven by common drive synchronously with one another.

In accordance with a still further embodiment of the invention in the terminal part of the shaping path pinions are provided in mesh with the racks of each train or sequence of mold halves, the shafts of such pinions being provided with detector devices responsive to the position of the teeth. The heating of the mold halves along the shaping path by the extruded tubular blank means that the mold halves become longer and such increase in length must be detected in order to ensure proper meshing of the transverse conveying pinion with the racks of the mold halves. This increase in length is measured by the detector or measuring pinions so that a suitable control device may then ensure rotation and angular adjustment of the transverse conveying means to provide for correct coming into mesh of the gear teeth.

In a similar manner it is possible for the upper part of the frame structure to be provided with means for raising and lowering it to allow for extension and contraction of the mold halves.

Another advantageous feature of the invention is such that following the transverse conveying pinions the return paths are provided with a parking station for the mold halves, which are able to be introduced into the return paths by drives of their own. The mold halves in the parking station may have specially customized configurations so that by suitably engaging the mold halves present in the parking station in pairs with the tubes, it is possible to produce, for instance, tube couplings on the tubes. When mold halves provided with specially customized configurations have run the length of the shaping path, the same will then be parked in the parking stations again by suitable drives of the transverse conveying means.

It is convenient for the frame structure to comprise two parts divided along the vertical longitudinal median plane which are able to be moved away from each other and to be locked together when adjacent to each other. This design renders it possible to cope with trouble conditions, such as caused by a failure of the electrical power supply, to move apart the frame parts, each with a train of mold halves, on the working path so that the mold halves are lifted clear of the extruded tube and solidification of the tube in the molds along the shaping path may be prevented.

The frame structure can be furthermore be adapted to be moved in guides by drives in the longitudinal direction thereof.

BRIEF DESCRIPTION OF THE DRAWINGS

One embodiment of the invention will now be described with reference to the drawing in more detail.

DETAIL DESCRIPTION OF THE PREFERRED EMBODIMENT

Figure 1:
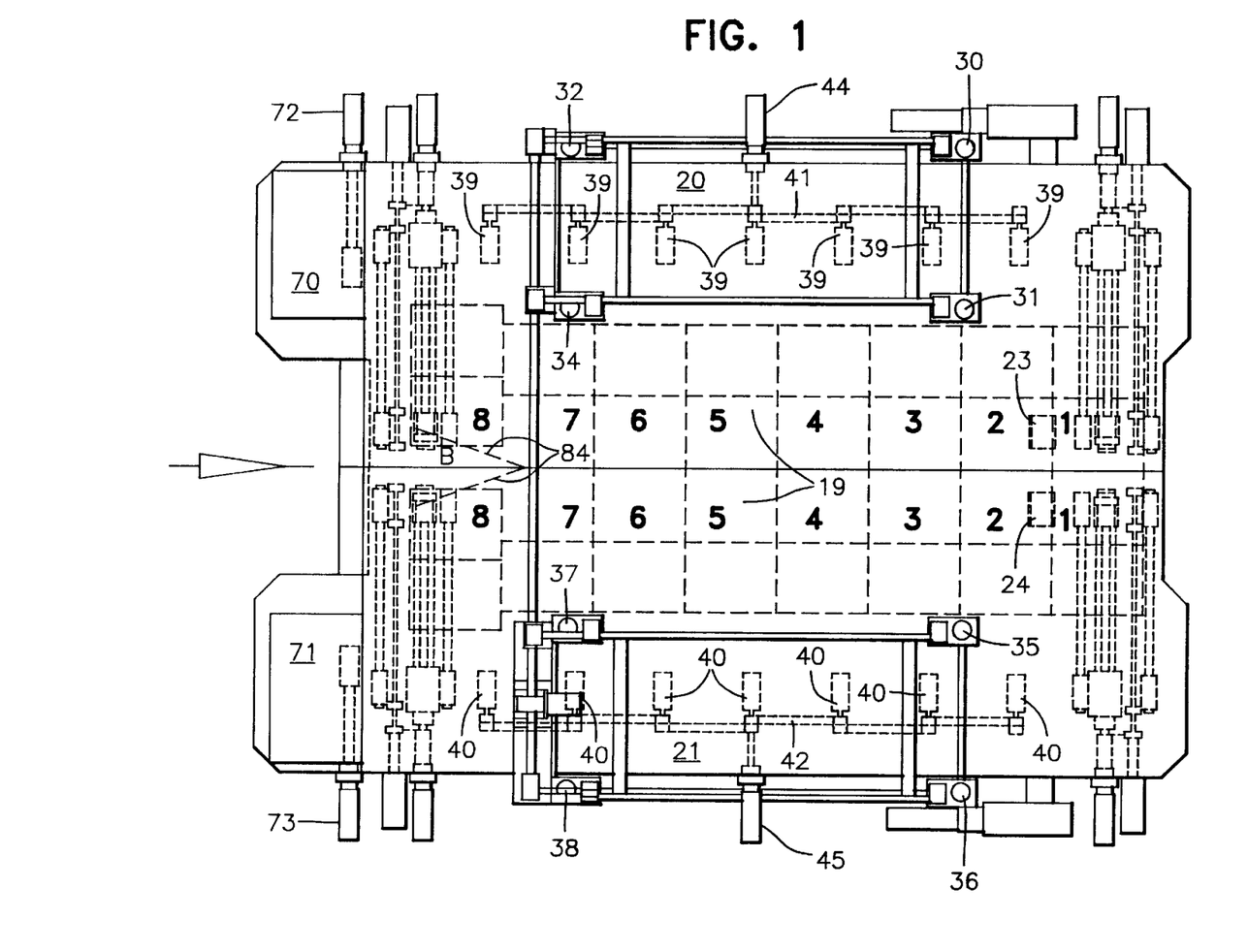
FIG. 1 is a plan view of the apparatus for the conveying of the mold halves.
Figure 2:
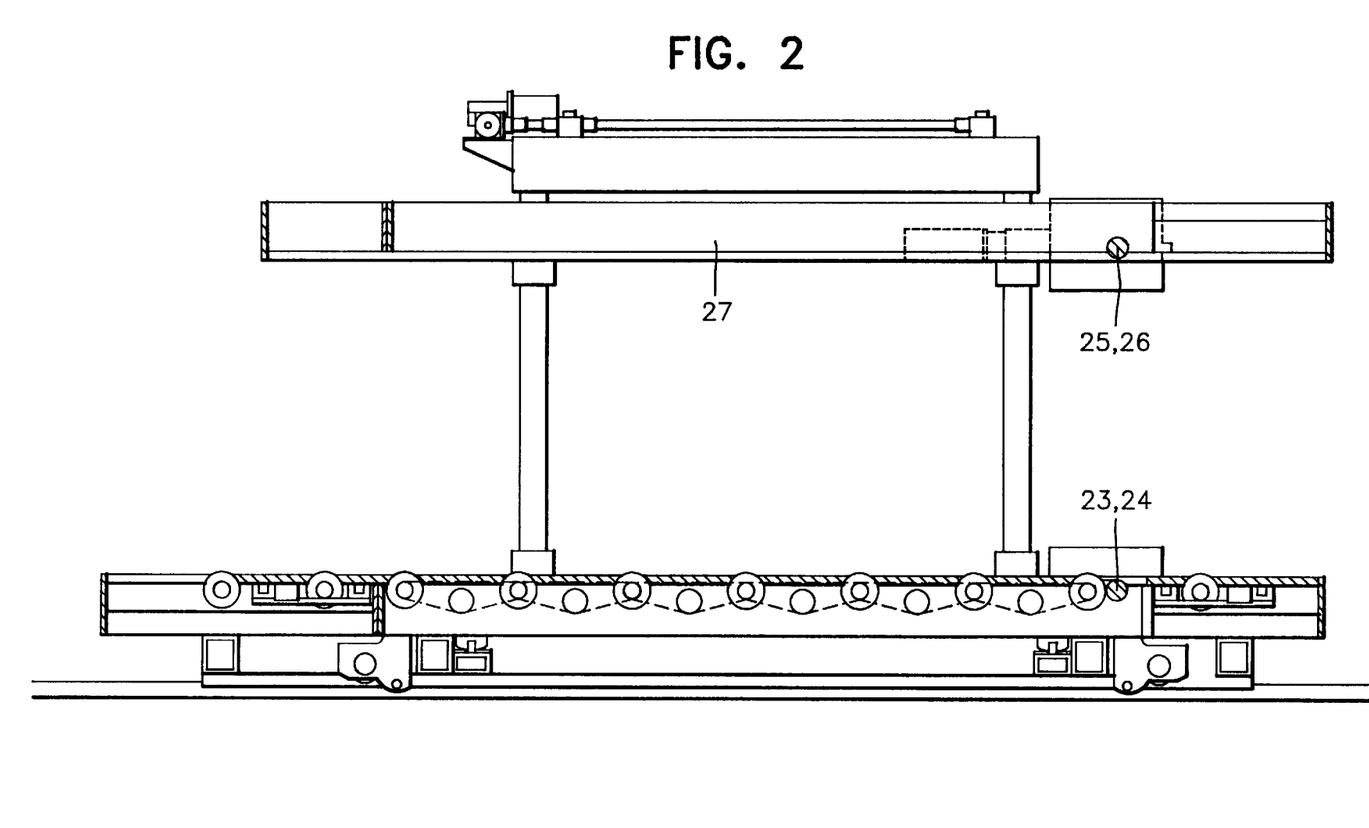
FIG. 2 shows a longitudinal section taken through the apparatus of FIG. 1.
Figure 3:
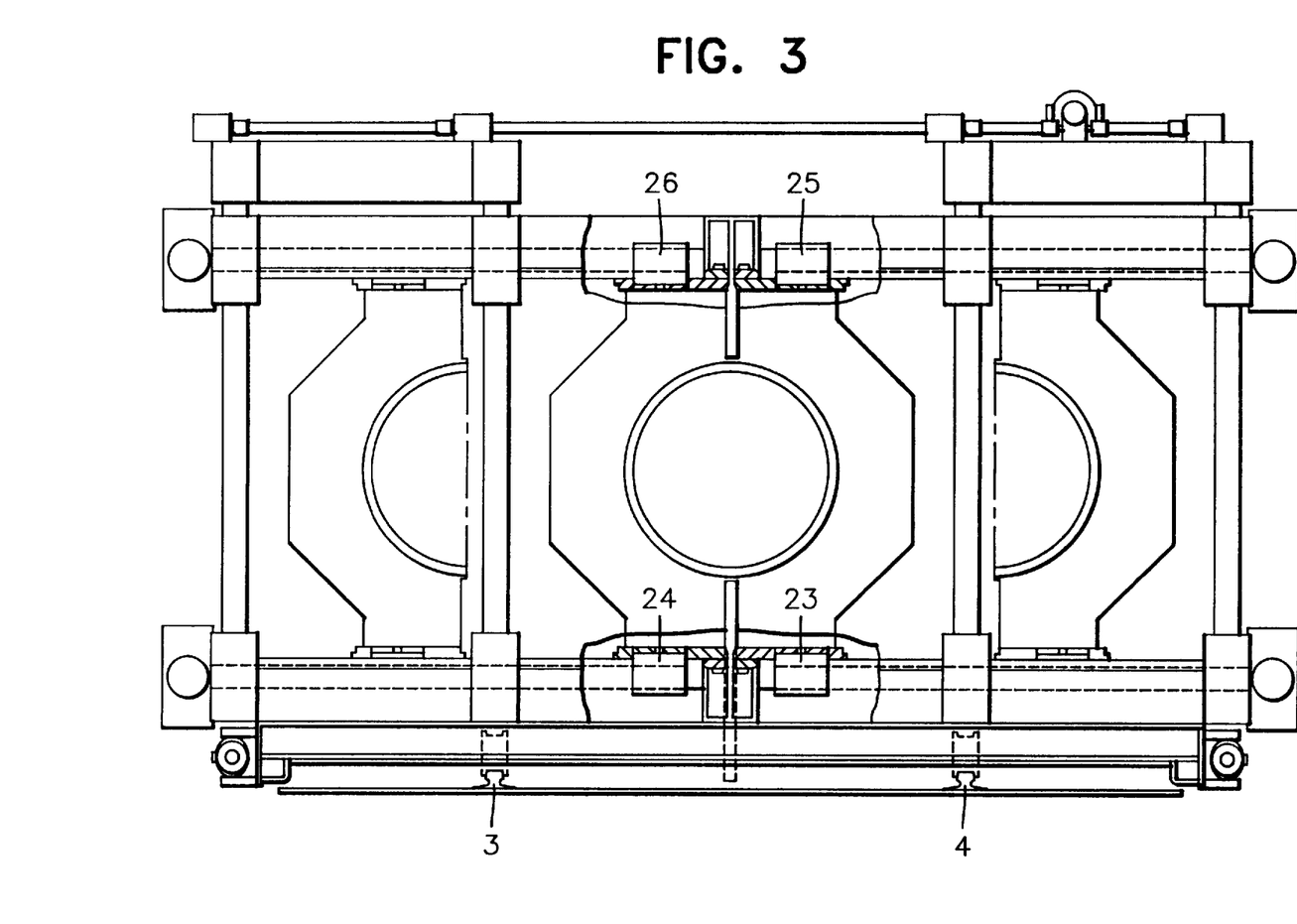
FIG. 3 shows a cross section taken through the apparatus of FIG. 1.
Figure 4:
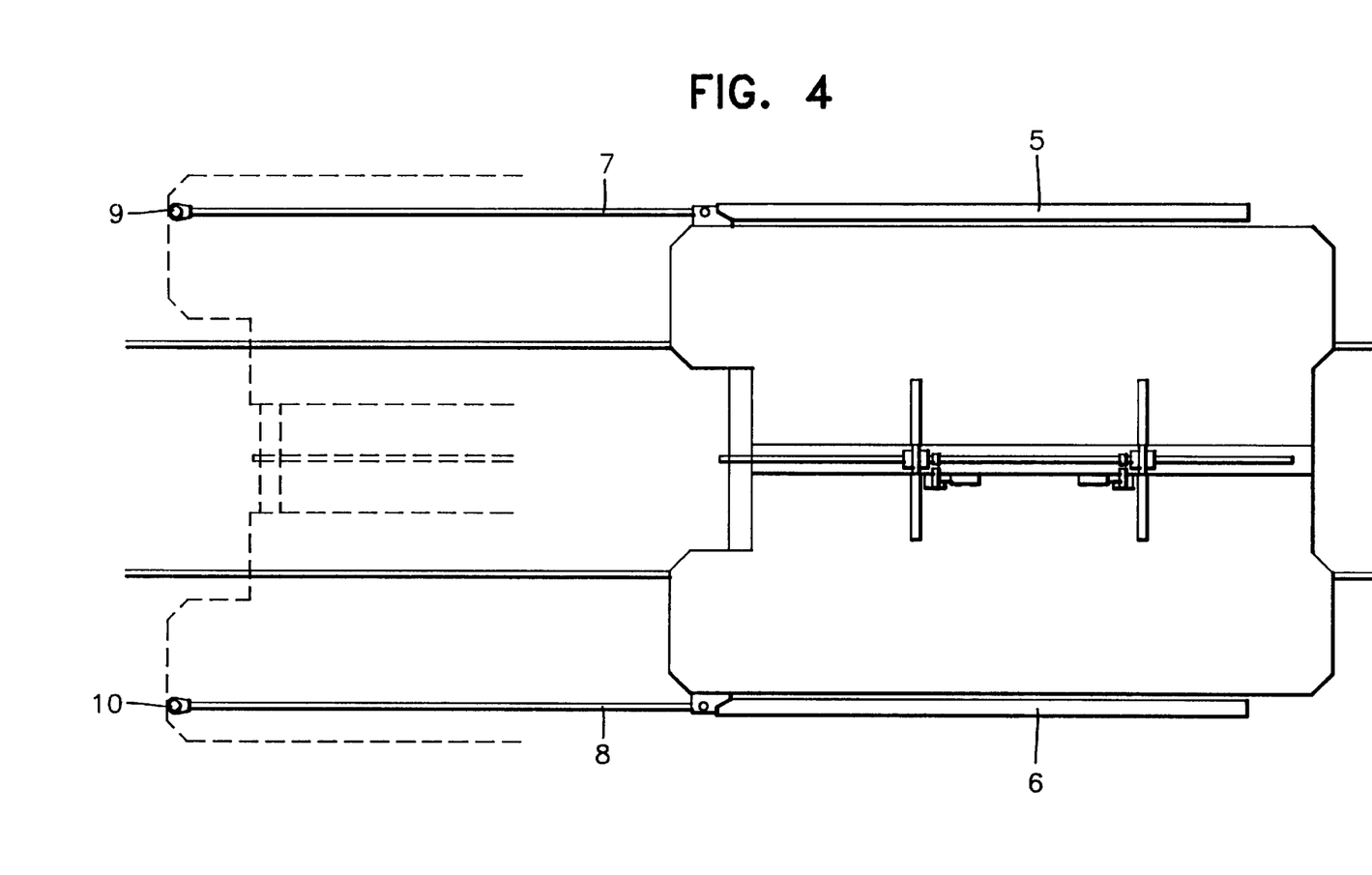
FIG. 4 is a plan view of the basic frame of the apparatus in accordance with FIG. 1.
Figure 5:
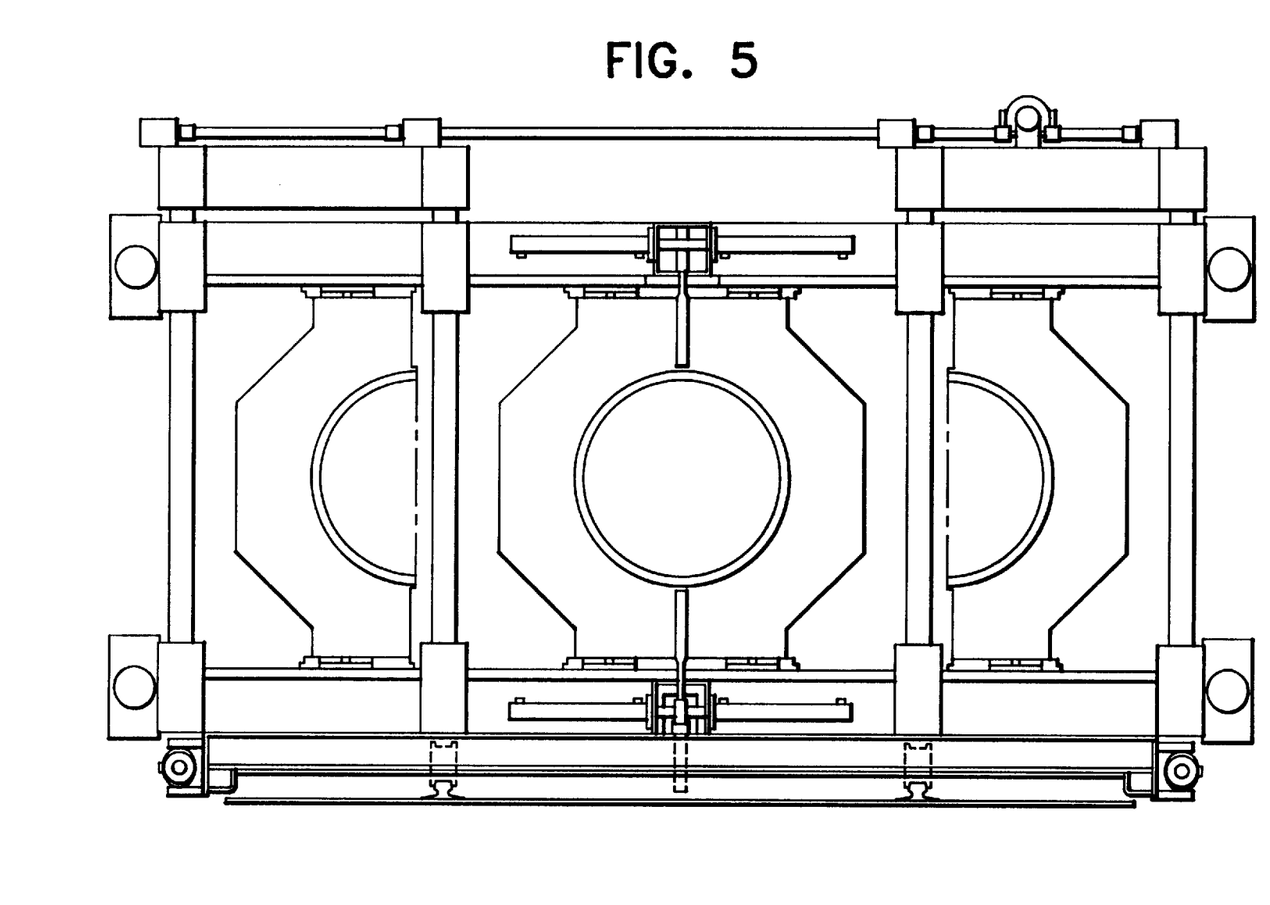
FIG. 5 shows a further cross section through the apparatus in accordance with FIG. 1.
Figure 6:
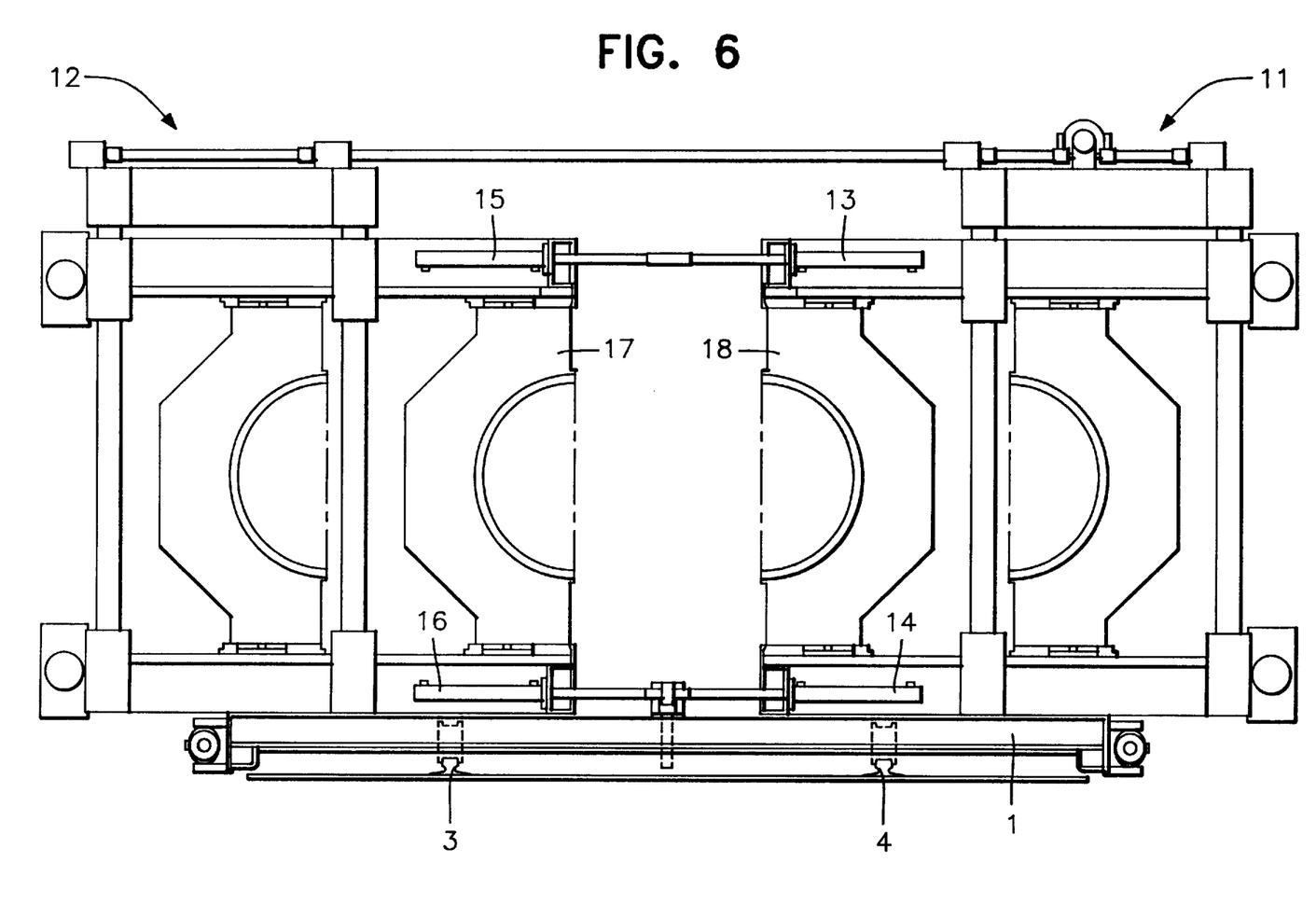
FIG. 6 is a cross section corresponding to FIG. 5 with the frame parts shown moved apart.

As best illustrated in FIGS. 4 through 6, the apparatus comprises a main frame 1, which runs on two rails 3 and 4 running in parallelism to the shaping path. For causing movement in the longitudinal use is made of hydraulic cylinders 5 and 6 which are mounted laterally of the main frame 1 and whose piston rods 7 and 8 are pivoted at fixed points 9 and 10. On the main frame 1 the frame parts 11 and 12 are guided for transverse shifting movement as caused by hydraulic piston and cylinder units 13 through 16. In the pushed-together position of the frame parts 11 and 12 the same are locked together. The frame parts 11 and 12 are each provided with two mutually parallel guides for the left and right mold halves 17 and 18, on which the same are moved along the working or shaping path 19 and along the return paths 20 and 21. On the shaping path 19 path depicted in FIG. 1 there are respectively eight mold halves 17 and 18 joined together as annular molds, the respective mold halves of a pair being separated apart in the outlet station B and moved together again in the inlet station A. The mold halves joined together as annular molds are moved along the shaping path 19 by pinions 23 and 24 and furthermore 25 and 26 engaging the upper and lower racks of the mold halves in pairs. The pinions 23 and 24 are bearinged in main frame parts, whereas the pinions 25 and 26 are bearinged in frames 27 and 28, which run on four respective columns 30 through 34 and 35 through 38 for upward and downward motion. Seven pinions 39 and 40 shunt the mold jaw halves along return paths 20 and 21, the halves being coupled together by chains or toothed belts 41 and 42 to rotate synchronously. The pinion 39 and 40 of the two return paths 20 and 21 are each driven by a common drive 44 and 45.

For the transverse conveying of the mold halves 17 and 18 between the shaping path 19 and the return paths 20 and 21 transverse conveying pinions 47 are mounted in the carriage 46 and are connected at their ends with edge disks 48 of larger diameter. The carriages 46 are screwed to the guide members 49 and 50, which run on mutually parallel guide rails 51 and 52 on each of the frame structure parts for transverse displacement.

The pins 53 on which the pinions 47 are rotatably mounted are hollow and mounted on the splined shafts 54 bearinged in the frame structure. The splined shafts are respectively coupled with customized servo drive motors 55.

Lead screw nuts 56 are attached to the carriage 46, through which leade screws 57, bearinged in the frame structure parts, extend, such lead screws also being coupled with their own servo drive motors 58.

Figure 7:
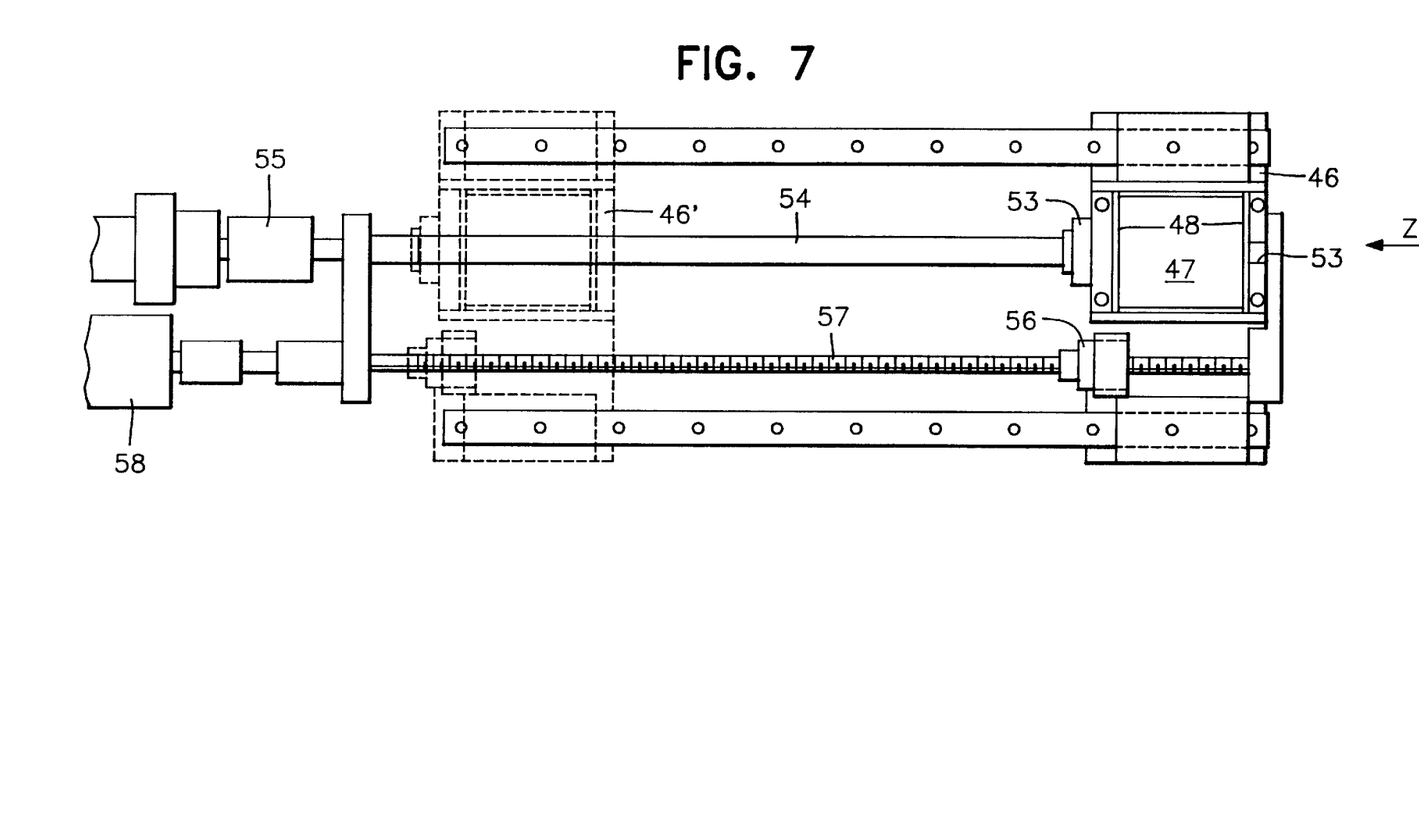
FIG. 7 is a plan view of a transverse conveying means, borne on a carriage, with a transverse conveying pinion, a setting lead screw and a pinion drive.
Figure 8:
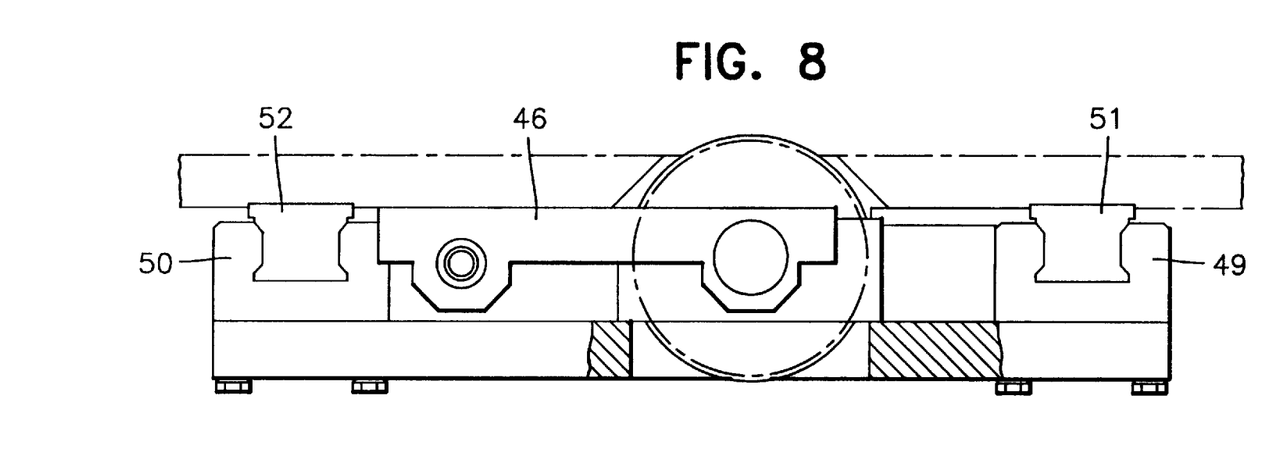
FIG. 8 shows an elevation of the carriage bearing the transverse conveying pinion looking in the direction of the arrow Z in FIG. 7.

In FIG. 7 the reader will see the carriage 46 in full lines in a position thereof, in which it is located for the transfer of a mold half to the shaping path. On left in FIG. 7 the carriage 46' is shown in broken lines in the position which it assumes for receiving mold halves moved along the respective return path.

Figure 9:
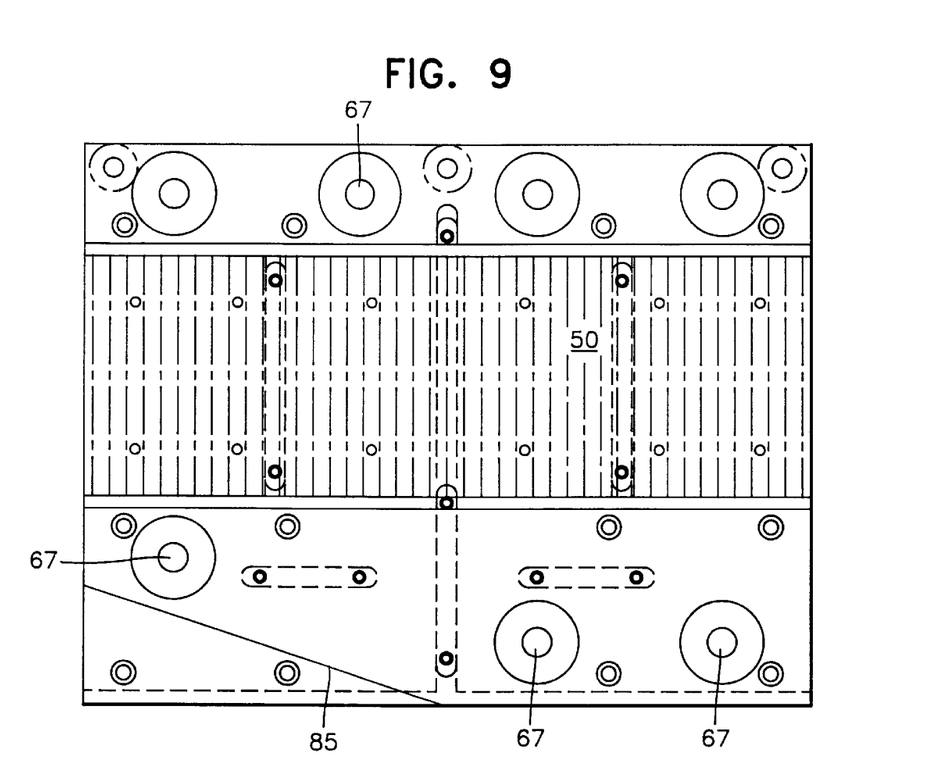
FIG. 9 is a plan view of one mold half.
Figure 10:
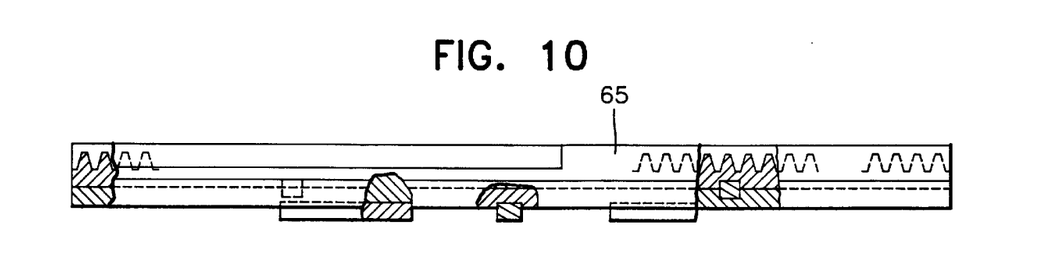
FIG. 10 is a lateral elevation of the upper, lateral mold jaw limiting plate, partly in section.
Figure 11:
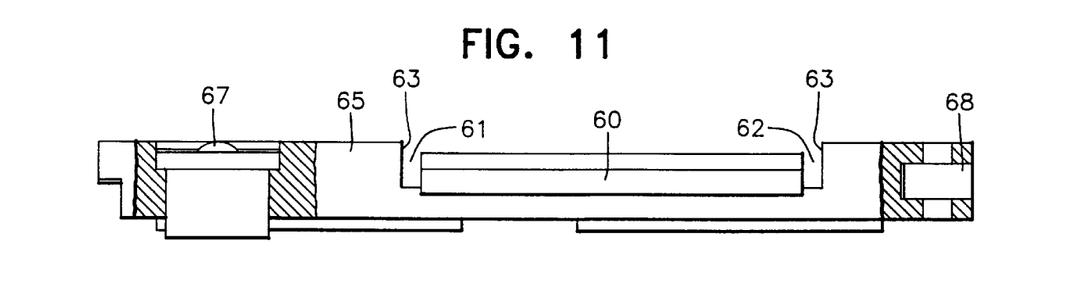
FIG. 11 is a section taken through the mold jaw plates taken on the line XI—XI in FIG. 9.

Each of the mold halves 17 and 18, which bear a bilaterally symmetrical relationship to one another, has a rack 60 on its upper and lower sides which meshes with the pinions. On each side of the racks 60 grooves 61 and 62 are provided in the manner indicated in FIG. 11, the outer flanks 63 thereof serving for guiding the edge disks 48 connected with the terminal surfaces of the pinions 47. The racks 60 are screwed to steel plates 65, which cover over the top and lower sides of the mold halves 17 and 18. To the side of the racks 60 balls 67 are mounted in part-spherical beds by means of small balls in the manner indicated in FIGS. 9 and 11, such balls serving as an-anti-friction bearing systems for guiding the mold halves 17 and 18 along the shaping path and the return path. The steel plates 65 bear rollers 68 at their outer ends, on which the same are supported along the shaping path on lateral guide rails.

The frame structure parts are provided with wedge-like oblique surfaces 84 (see FIG. 1) adjacent to the outlet to cooperate with corresponding oblique surfaces 85 (see FIG. 9) on the mold halves so that the movement along the shaping path is modified by a transverse component of movement with which the mold halves are shifted out of engagement with the corrugated tube shaped on the shaping path during the movement of the mold halves at the synchronous speed along the shaping path. It is only after the mold halves have been moved transversely by the wedge is it that the racks of the transverse shifted mold halves come into engagement with the transverse conveying pinion, which then move the mold halves into the return paths 20 and 21.

Since the mold halves 17 and 18 consist of aluminum castings, the steel plates are connected with the mold halves in a manner which takes the different expansion rates of aluminum and steel into account.

Figure 12:
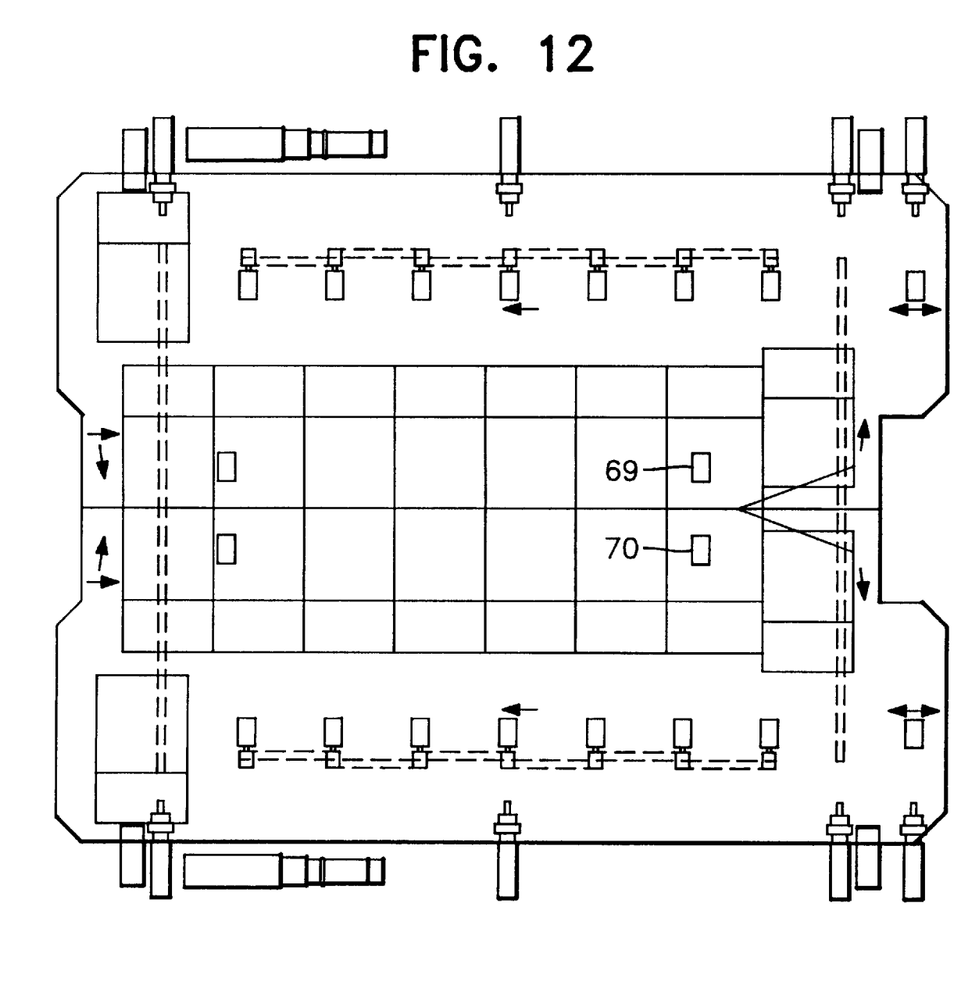
FIG. 12 is a diagrammatic plan view of the apparatus in accordance with FIG. 1.
Figure 13:
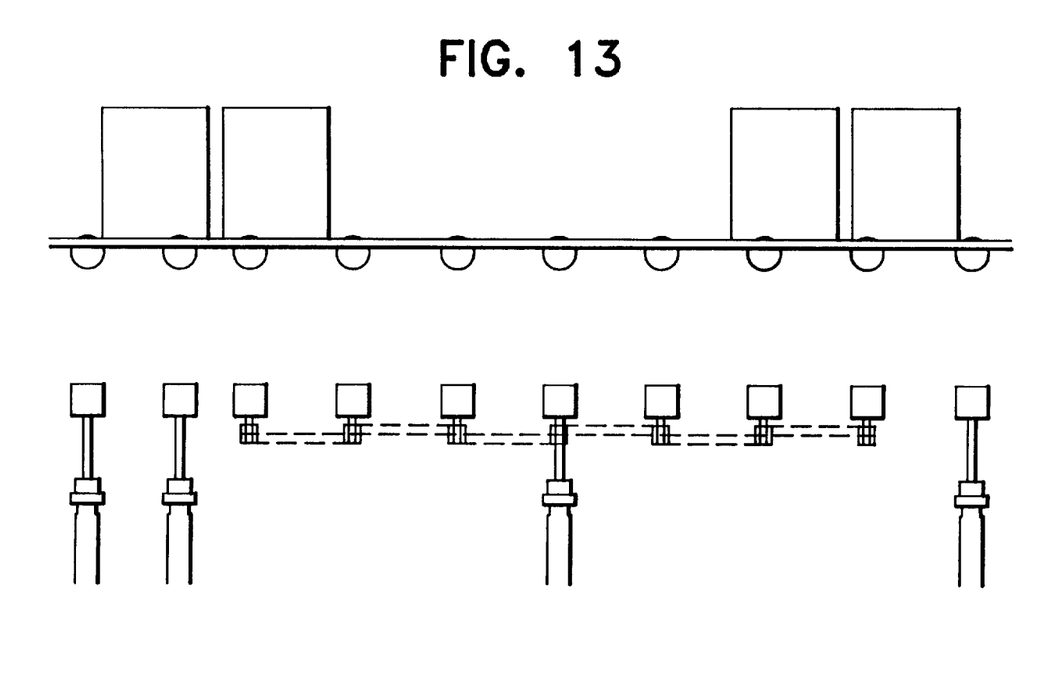
FIG. 13 is a drive diagram of the pinions of a return conveying path.
Figure 14A:
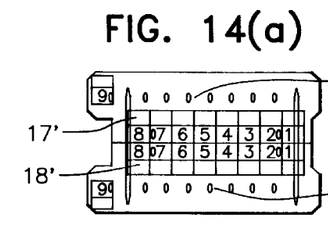
FIGS. 14a through FIG. 14p represent a timing chart of conveying of two mold jaws from the outlet back to the inlet.
Figure 14B:
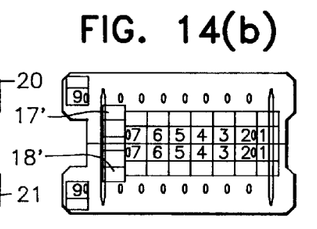
Figure 14C:
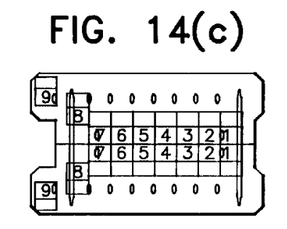
Figure 14D:
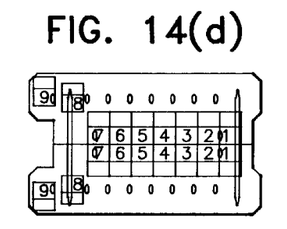
Figure 14E:
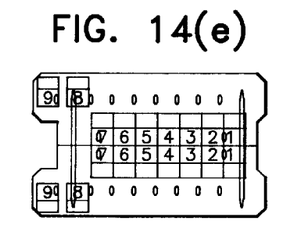
Figure 14F:
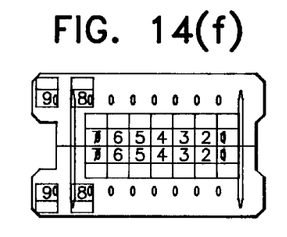
Figure 14G:
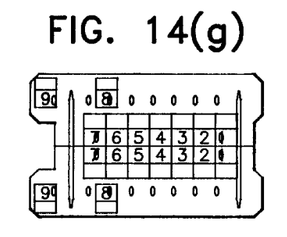
Figure 14H:
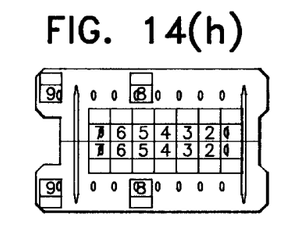
Figure 14I:
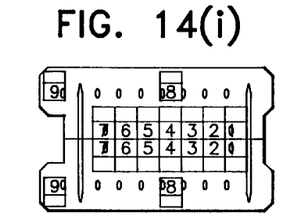
Figure 14J:
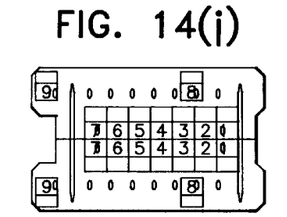
Figure 14K:
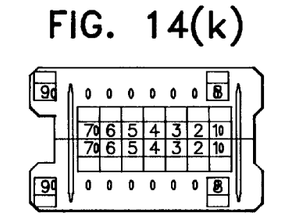
Figure 14L:
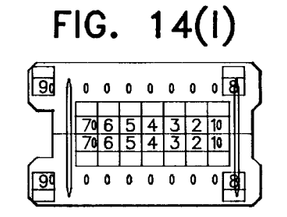
Figure 14M:
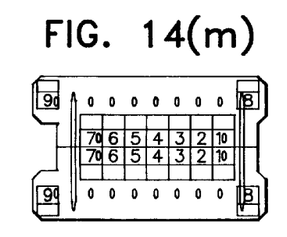
Figure 14N:
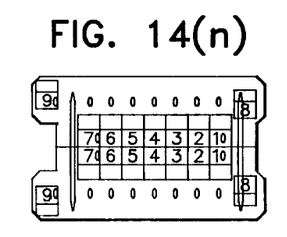
Figure 14O:
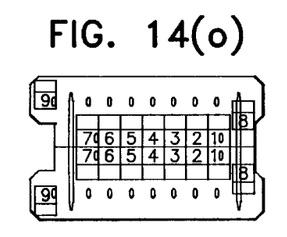
Figure 14P:
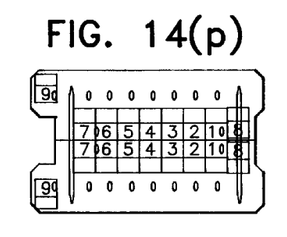

As shown in FIG. 12 in the terminal part of the shaping path two measuring or detector pinions 69 and 70 are bearinged in the frame structure, which mesh with the racks of the two trains of mold halves located in the shaping paths. These detector pinions 69 and 70 detect the expansion of the mold halves on the shaping path in the longitudinal direction and transmit the same via their shafts to the control device of the equipment. The control device will then correct the angular setting of the transverse conveying pinion 47 in accordance with the expansion detected so that the racks at the outlet part will be able to come into mesh with the teeth of the transverse conveying pinions.

Parking stations 70 and 71 are provided in an extension of the return paths 20 and 21 beyond the transverse conveying path of the carriages 46 in the return paths, and mold halves with customized configuration may be held ready in such stations. These parking stations 70 and 71 are provided with their own drives 72 and 73 for the parking mold halves so that the same may be re-introduced into the return paths in pairs as required.

FIG. 14 is a chart showing the timing of the transfer of the mold halves 17' and 18' in the return paths 20 and 21 at the outlet and are put together again at the inlet in pairs. In FIG. 14a the mold halves 17 and 18 are at the end of the shaping path. The mold halves 17 and 18 come into engagement with the transverse conveying pinions 47, which firstly ensure further conveying of the mold jaw halves in synchronism with the shaping path and move then at a slightly higher speed as soon as they have been conveyed past the oblique surface as far to the outside that the shaping ribs have come clear of the valleys between the corrugations of the corrugated tubing. As soon as the transverse conveying pinions have moved the mold halves outward in the return paths 20 and 21, the drives thereof are reversed so that the racks of the mold halves 17 and 18 come to engage return conveying pinion of the return paths 20 and 21. The mold jaws are then accelerated by the synchronously driven return conveying pinion to the return shunting speed, before they are retarded again, when they arrive at the transverse conveying pinion of the inlet side. At the inlet mold halves are then put together again by the transverse conveying pinions into their annular closed form as molds and transferred to the four pinions, which then convey them along the shaping path.

The shunting of the mold halves 17' and 18' from the outlet to the inlet is represented in FIGS. 14 and 16 in steps, each step corresponding to one second in the time of operation.

Figure 15A:
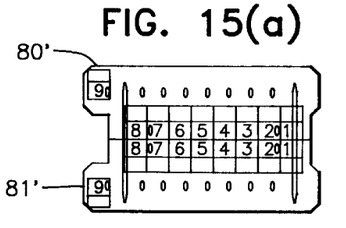
FIGS. 15a through FIG. 15p represent a chart showing the timing of conveying of the mold jaws back from the outlet to the inlet, in the case of which mold halves parked in the parking station are supplied into the return paths.
Figure 15B:
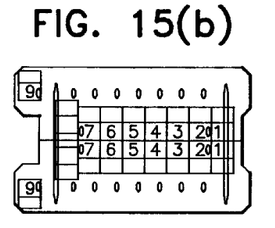
Figure 15C:
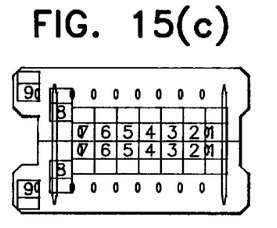
Figure 15D:
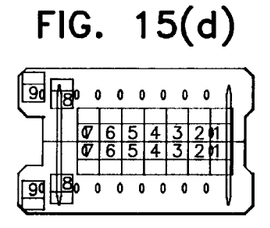
Figure 15E:
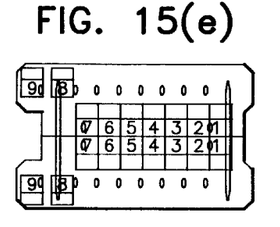
Figure 15F:
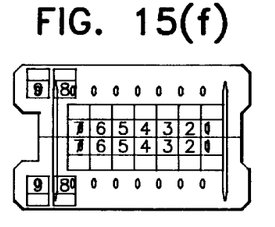
Figure 15G:
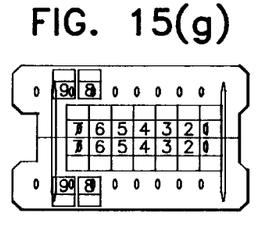
Figure 15H:
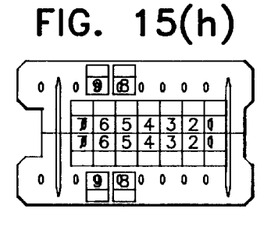
Figure 15I:
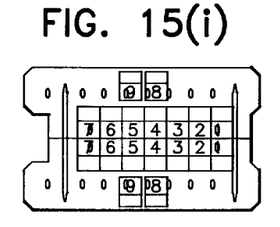
Figure 15J:
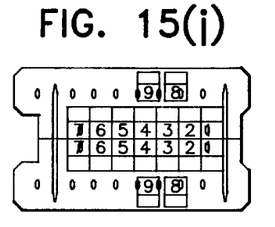
Figure 15K:
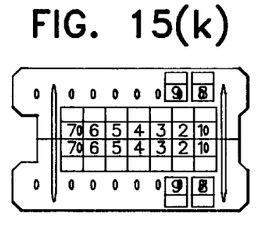
Figure 15L:
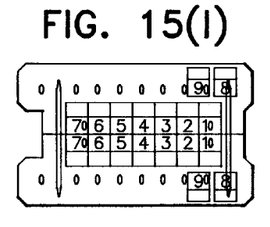
Figure 15M:
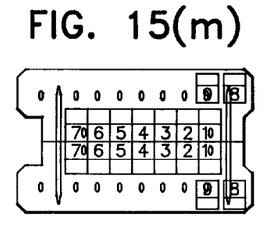
Figure 15N:
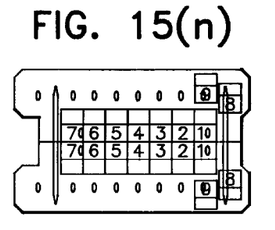
Figure 15O:
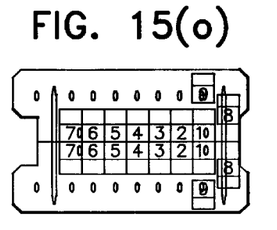
Figure 15P:
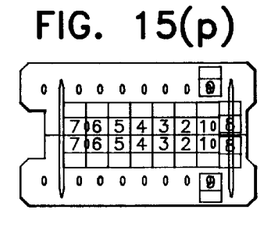
Figure 16A:
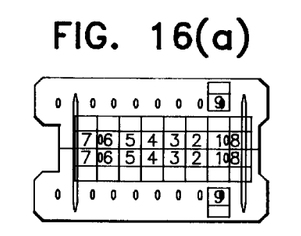
FIGS. 16a and FIG. 16p show the return of a pair of mold jaws to the parking station.
Figure 16B:
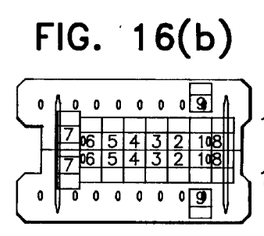
Figure 16C:
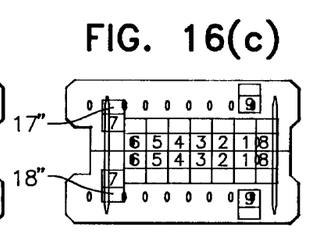
Figure 16D:
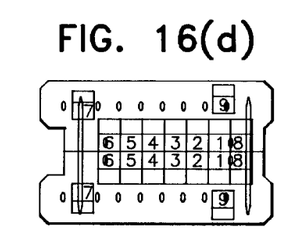
Figure 16E:
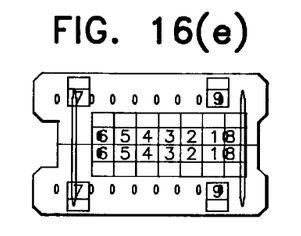
Figure 16F:
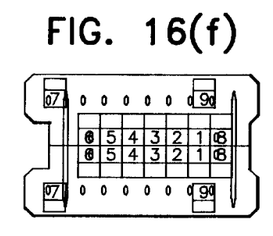
Figure 16G:
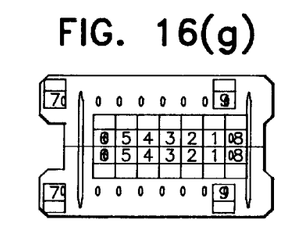
Figure 16H:
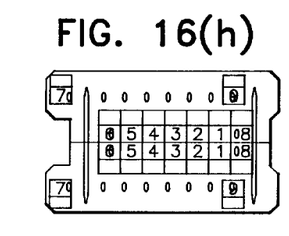
Figure 16I:
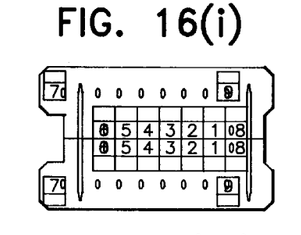
Figure 16J:
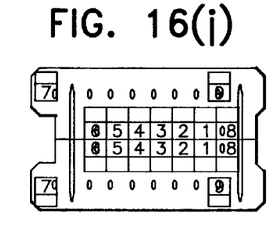
Figure 16K:
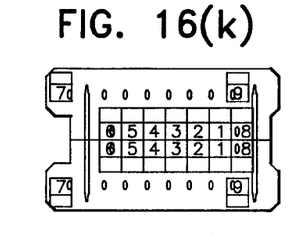
Figure 16L:
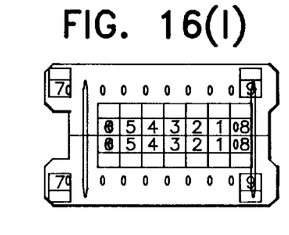
Figure 16M:
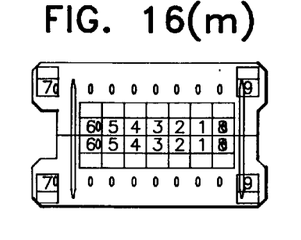
Figure 16N:
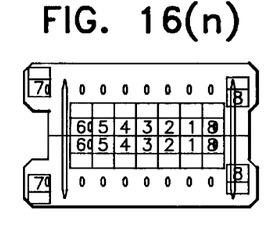
Figure 16O:
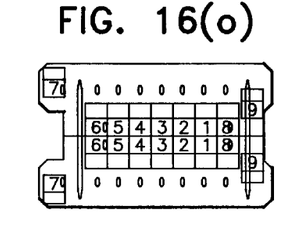
Figure 16P:
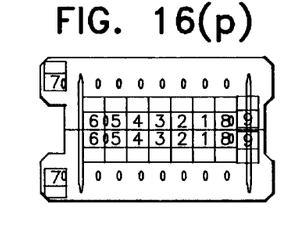

It will be apparent from FIGS. 15a through 15p how in the parking station parking customized mold halves 80' and 81' are supplied to the return paths and in the shaping path are moved together by the transverse conveying pinions. As shown in FIG. 15 the control of the equipment during the introduction of the customized mold halves 80' and 81' is performed by their being conveyed via the transverse conveying pinion at the outlet, when the same are in their return paths.

It will be apparent from FIG. 16 how the mold halves 17" and 18" are temporarily parked in the parking stations, while the customized mold halves 80' and 81' are being pushed along the shaping path.

We claim:

1. An apparatus for the manufacture of corrugated tubing of synthetic resin, said apparatus comprising
    a shaping path adjoining a head of an extruder, said shaping path being composed of a guide arranged in a frame structure, along which guide mold halves closed together in pairs as annular molds are advanced in close succession, said mold halves being provided on a lower side thereof with racks,
    at least one drive pinion arranged in the initial part of the shaping path for meshing with the racks of the mold halves as the same are pushed together to form said shaping path, and
    an outlet of the shaping path, at which each pair of the mold halves are separated from one another and are transferred to mutually separate return paths, on which a plurality of mold halves are shunted by a conveyor along said return paths to the inlet of said shaping path,
    said conveyor including driven pinions engaging, in sequence, with the racks of each pair of mold halves simultaneously located in said return paths and the transverse conveyance of said plurality of mold halves between the return paths and the inlet and between the outlet and the return paths are caused by transversely driven pinions.

2. The apparatus as claimed in claim 1, wherein the driven pinions engaging respective teeth of the racks on the mold halves in the inlet and outlet of the shaping path, have end surfaces, or edge disks connected with them, in interlocking engagement with flanks which encircle the racks and the pinions are provided with drives transversely conveying the same.

3. The apparatus as claimed in claim 2, wherein the edge disks possess a larger diameter than the pinions.

4. The apparatus as claimed in claim 1, wherein for each train of mold halves along the shaping path one respective drive pinion is provided.

5. The apparatus as claimed in 1, wherein each transversely conveying pinion is bearinged in a carriage adapted to move in guides and which is provided with a drive for moving the same.

6. The apparatus as claimed in claim 5, wherein each carriage is adapted to be moved by a lead screw which is bearinged in a manner fixed in relation to the frame structure and is provided with a drive.

7. The apparatus as claimed in claim 1, wherein each pinion bearinged in a carriage is adapted to slide on a splined shaft which is bearinged in a manner fixed in relation to the frame structure and is provided with a drive.

8. The apparatus as claimed in claim 1, wherein the mold halves are provided on upper and lower sides thereof with racks and in the initial part of the shaping path drive pinions are provided for meshing both with the lower and also with the upper racks.

9. The apparatus as claimed in claim 1, wherein the mold halves are provided with oblique guide surfaces which in the exit part of the shaping path cooperate with corresponding oblique guide surfaces of the frame structure.

10. The apparatus as claimed in claim 1, wherein along the shaping path the mold halves are supported by rollers running on lateral guide sections.

11. The apparatus as claimed in claim 1, wherein on upper and lower sides thereof the mold halves are provided with rollers or freely rotatable balls adapted to cooperate with upper and lower guides or guide surfaces on the frame structure.

12. The apparatus as claimed in claim 1, wherein the pinions of each of the two return paths are drivingly connected together and are adapted to be driven synchronously by a common drive.

13. The apparatus as claimed in claim 1, wherein in an end part of the shaping path detector pinions are arranged adapted to mesh with the racks of each train of mold halves, shafts of such detector pinions being provided with a detector responsive to the position of the teeth of the racks.

14. The apparatus as claimed in claim 1, wherein the upper part of the frame structure is adapted to be raised and lowered in accordance with the expansion and contraction of the mold halves.

15. The apparatus as claimed in claim 1, wherein following the transverse conveying pinion the return paths are provided with parking stations for mold halves, which are able to be re-introduced into the return paths by their own drives.

16. The apparatus as claimed in claim 1, wherein the frame structure comprises two parts which are divided in a vertical longitudinal median plane and are able to be drawn apart and locked together in a pushed together setting thereof.

17. The apparatus as claimed in claim 1, wherein the frame structure is provided with guides for longitudinal sliding motion thereof.

* * * * *